(12) United States Patent
Glinka

(10) Patent No.: US 7,021,581 B2
(45) Date of Patent: Apr. 4, 2006

(54) FASTENING DEVICE FOR A SEAT BELT

(75) Inventor: Oliver Glinka, Ulm (DE)

(73) Assignee: TAKATA-PETRI (Ulm) GmbH, Ulm (DE)

( * ) Notice: Subject to any disclaimer, the term of this patent is extended or adjusted under 35 U.S.C. 154(b) by 0 days.

(21) Appl. No.: 10/781,851

(22) Filed: Feb. 20, 2004

(65) Prior Publication Data

US 2004/0251365 A1    Dec. 16, 2004

(30) Foreign Application Priority Data

Feb. 20, 2003   (DE)   ................ 103 08 167

(51) Int. Cl.
*B60R 22/28*   (2006.01)
(52) U.S. Cl. .................................. 242/379.1
(58) Field of Classification Search ............ 242/379.1
See application file for complete search history.

(56) References Cited

U.S. PATENT DOCUMENTS

| | | | | |
|---|---|---|---|---|
| 3,561,690 A * | 2/1971 | Muskat | .................. | 242/379.1 |
| 5,443,222 A * | 8/1995 | Modinger et al. | .......... | 242/374 |
| 5,704,645 A * | 1/1998 | Arthurs et al. | .............. | 280/805 |
| 5,772,144 A * | 6/1998 | Tanabe et al. | ........... | 242/379.1 |
| 5,975,451 A * | 11/1999 | Kawamoto | ................ | 242/379.1 |
| 6,241,172 B1 | 6/2001 | Fugel et al. | | |
| 6,250,579 B1 | 6/2001 | Bannert et al. | | |
| 6,264,280 B1 * | 7/2001 | Ohlund | ........................ | 297/474 |
| 6,425,542 B1 * | 7/2002 | Huber | ...................... | 242/379.1 |
| 6,705,558 B1 * | 3/2004 | Specht et al. | ............ | 242/379.1 |

FOREIGN PATENT DOCUMENTS

| | | |
|---|---|---|
| DE | 39 04 667 C1 | 4/1990 |
| DE | 197 80 583 C1 | 12/1997 |
| DE | 197 47 461 A1 | 4/1999 |

* cited by examiner

*Primary Examiner*—Kathy Matecki
*Assistant Examiner*—Sang Kim
(74) *Attorney, Agent, or Firm*—Foley & Lardner LLP

(57) ABSTRACT

A fastening device for a seat belt comprising at least one belt-force-limiting element which, in the event of an accident, limits the retaining force acting on a person protected by the seat belt by enabling the seat belt to yield to a predetermined extent. The belt-force-limiting element includes a wire-unwinding device from which at least one wire can be pulled out on exertion of a predetermined tensile force, and one end of the seat belt is connected indirectly or directly to the at least one wire in such a manner that the at least one wire is pulled out of the wire-unwinding device as soon as the retaining force exerted by the seat belt on the occupant reaches or exceeds the predetermined tensile force.

12 Claims, 4 Drawing Sheets

FASTENING DEVICE FOR A SEAT BELT

BACKGROUND

The application relates to a fastening device for a seat belt.

A conventional fastening device of this type for a seat belt is disclosed in German patent specification DE 197 80 583 C1 (incorporated by reference herein). The conventional fastening device is a belt retractor having a belt-force-limiting element. The belt-force-limiting element is formed in the conventional belt retractor by means of a torsion bar and a torsion sleeve. The manner of operation of the belt retractor is as follows: if a vehicle accident occurs, then the vehicle occupant will "plunge" into the seat belt due to his kinetic energy; this "plunging movement" causes a tensile force to suddenly be exerted on the locking seat belt. If the seat belt were not able to yield, then a considerable restraining force would be built up on the vehicle occupant, as a result of which serious injuries could occur. In order to avoid this, the conventional belt retractor is provided with the torsion bar and the torsion sleeve which, owing to their torsion, cause an unrolling of the seat belt and therefore a lengthening of the seat belt. The further unrolling causes a reduction in the restraining force, and injuries by the belt are avoided.

SUMMARY OF THE INVENTION

According to an embodiment of the present invention, a fastening device for a seat belt includes at least one belt-force-limiting element which limits the retaining force acting on a person protected by the seat belt by enabling the seat belt to yield to a predetermined extent. The belt-force-limiting element has a wire-unwinding device from which at least one wire can be pulled on exertion of a predetermined tensile force, and one end of the seat belt is connected indirectly or directly to the at least one wire in such a manner that the at least one wire is pulled out of the wire-unwinding device as soon as the retaining force exerted by the seat belt on the occupant reaches the predetermined tensile force.

It is to be understood that both the foregoing general description and the following detailed description are exemplary and exemplary only and are not restrictive of the invention as claimed.

BRIEF DESCRIPTION OF THE DRAWINGS

These and other features, aspects, and advantages of the present invention will become apparent from the following description, appended claims, and the accompanying embodiments shown in the drawings, which are briefly described below.

DETAILED DESCRIPTION

Hereinafter, embodiments of the present invention will be described with reference to the attached drawings.

Figure 1:
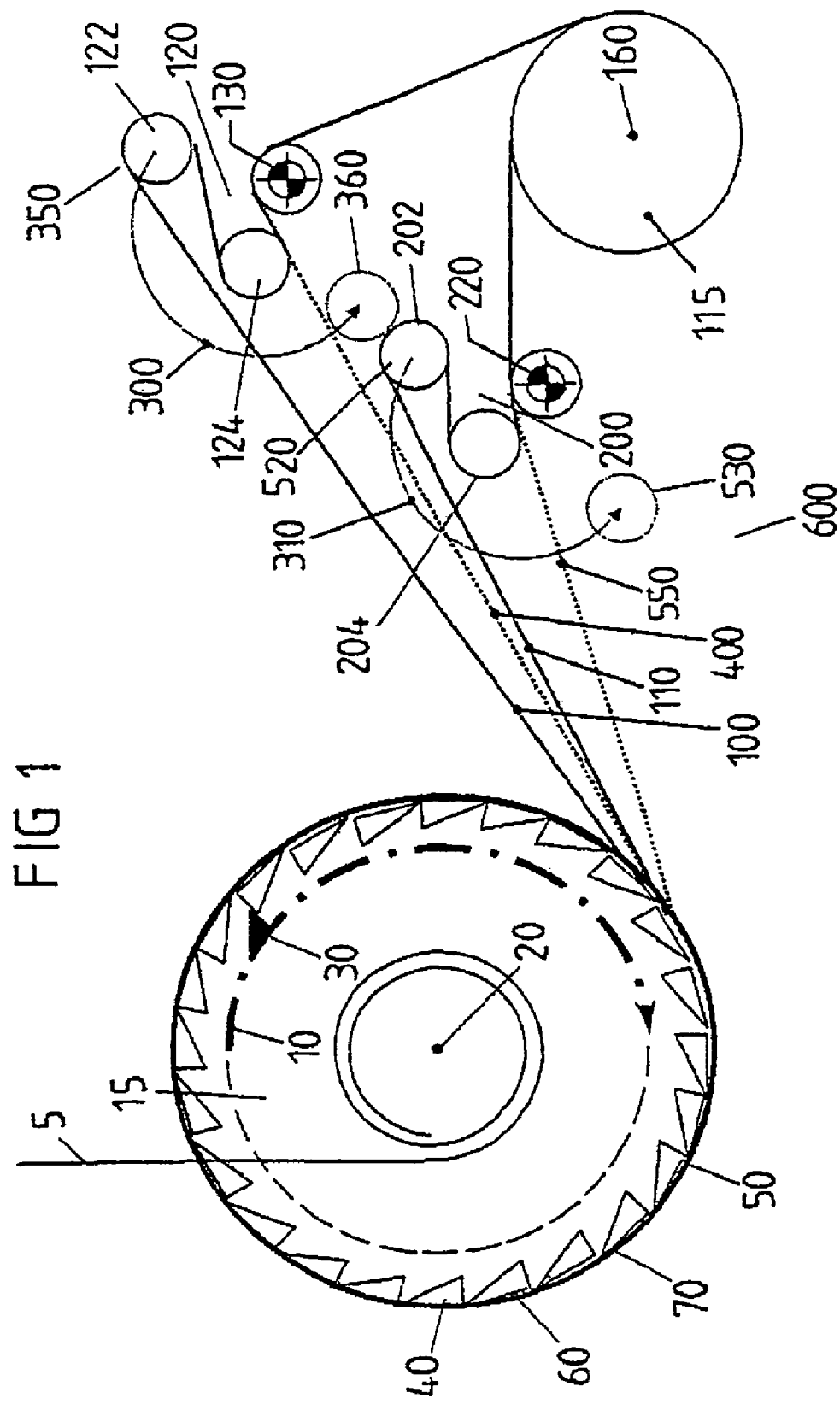
FIG. 1 is a view of an embodiment of a fastening device for a seat belt.

FIG. 1 shows a belt strap 5 which is retracted onto a spindle 10 of "belt retractor" 15. The spindle 10 is mounted rotatably about an axis 20. On its outer edge, the spindle 10 has a pawl 30 which "disengages" during an abrupt acceleration of the spindle 10 and comes into contact with inner locking teeth 40 of a ratchet ring 50. The ratchet ring 50 is likewise mounted rotatably about the axis 20; however, rotation of the ratchet ring 50 only occurs if the pawl 30 is locked by the inner locking teeth 40 of the ratchet ring 50.

The ratchet ring 50 has a wire magazine 70 on its outer edge 60. In FIG. 1, it can be seen that two wires are coiled around the wire magazine 70 of the ratchet ring 50, namely a first wire 100 and a second wire 110. In addition, the two wires 100 and 110 are each coiled around a wire reel 115.

A first switching rocker 120—comprising a first deflecting roller 122 and a second deflecting roller 124—and also a third deflecting roller 130 are arranged between the wire reel 115 and the wire magazine 70. A rotational movement of the ratchet ring 50 causes the first wire 100 to be unrolled from the wire reel 115 and at the same time to be rolled onto the wire magazine 70 of the ratchet ring 50; in the process, the wire coil 115 rotates about its axis 160.

Moreover, the second wire 110 is coiled around the wire reel 115, via a second switching rocker 200—comprising a fourth deflecting roller 202 and a fifth deflecting roller 204—and also via a sixth deflecting roller 220. The second wire 110 is uncoiled from the wire reel 115 and coiled around the wire magazine 70 of the ratchet ring 50 when the ratchet ring 50 rotates.

The two switching rockers 120 and 200 are each designed in a manner such that they can be folded over, as illustrated by the broken arrows 300 and 310 in FIG. 1.

If, for example, the first switching rocker 120 is folded over, then the first deflecting roller 122 of the first switching rocker 120 is moved from its first position 350 into its second position 360. This results in the guidance of the wire being changed; specifically, the first wire 100 is no longer deflected three times on its path from the wire reel 115 to the wire magazine 70 of the ratchet ring 50, but rather only once, specifically by the third deflecting roller 130. This is illustrated in FIG. 1 by the broken line 400 which indicates the manner in which the first wire 100 runs after the first switching rocker 120 has been folded over from the first position 350 into the second position 360.

In addition, FIG. 1 shows that the second switching rocker 200 may also be switched over. Thus, the fourth deflecting roller 202 of the second switching rocker 200 can be folded over from a first position (indicated by the reference number 520 in FIG. 1) into a second position (indicated by the reference number 530). In the process, the position of the fifth deflecting roller 204 of the second switching rocker 200 remains unchanged.

During this folding-over of the second switching rocker 200 from the first position 520 into the second position 530, the profile of the second wire 110 is likewise influenced. Thus, after the second switching rocker 200 has been folded over, the second wire 110 is only bent over by the sixth deflecting roller 220. This is illustrated in FIG. 1 by the broken line 550 which indicates the manner in which the second wire 110 runs after the second switching rocker 200 has been folded over from the first position 520 into the second position 530. In this second position 530, an additional double deflection or bending over of the second wire 110 by the second switching rocker 200, as is the case in the first position 520 of the fourth deflecting roller 202, is no longer provided.

The six deflecting rollers 122, 124, 130, 202, 204, 220, the wire reel 115 and the wire magazine 70 comprise a wire-unwinding device 600 which acts on the belt retractor 15. The belt retractor 15 and the wire-unwinding device 600 together form a fastening device for the seat belt or the belt strap 5.

The manner of operation of the fastening device according to FIG. 1 will now be explained below in conjunction with FIG. 2.

In the event of a vehicle accident, a vehicle occupant secured by the belt strap 5 or the seat belt 5 of the fastening device according to FIG. 1 will exert a tensile force on the belt strap 5. In this case, the pawl 30 will activate the spindle 10, which leads to the spindle 10 being locked to the rotatably mounted ratchet ring 50. This in turn leads to the ratchet ring 50 rotating at the same time because a considerable tensile force is namely exerted on the seat belt. Owing to the rotation of the ratchet ring 50, the first wire 100 and the second wire 110 are retracted onto the wire magazine 70 of the ratchet ring 50.

The first switching rocker 120 and the second switching rocker 200 are firstly situated in each case in their first position 350 and 520, respectively, i.e. the two wires 100 and 110 take a path as is shown in FIG. 1 by the solid lines.

Owing to the two switching rockers 120 and 200 being in the first position, the two wires 100 and 110 have to be deflected or bent over three times in each case. Thus, the first wire 100 has to be guided over the third deflecting roller 130, over the second deflecting roller 124 and over the first deflecting roller 122 before it reaches the wire magazine 70—coming from the wire reel 115. The same applies to the second wire 110, which is guided over the sixth, fifth and fourth deflecting roller 220, 204, 202 before it reaches the wire magazine 70.

This triple deflection in each case means that a considerable deformation of the wire or a considerable "bending-over" of the wire is required, this requires a large effort.

At an appropriate tensile force, the wires 100 and 110 are nevertheless retracted onto the wire magazine 70. The counterforce which is provided by the wire-unwinding device 600 is approximately constant: the counterforce corresponds to the belt-restraining force which the belt strap 5 exerts on the vehicle occupant in a vehicle accident. This counterforce or belt-restraining force bears the reference number F1 in the diagram according to FIG. 2.

The belt-restraining force F1 can now be reduced by, for example, the first switching rocker 120 and/or the second switching rocker 200 being switched over.

Figure 2:
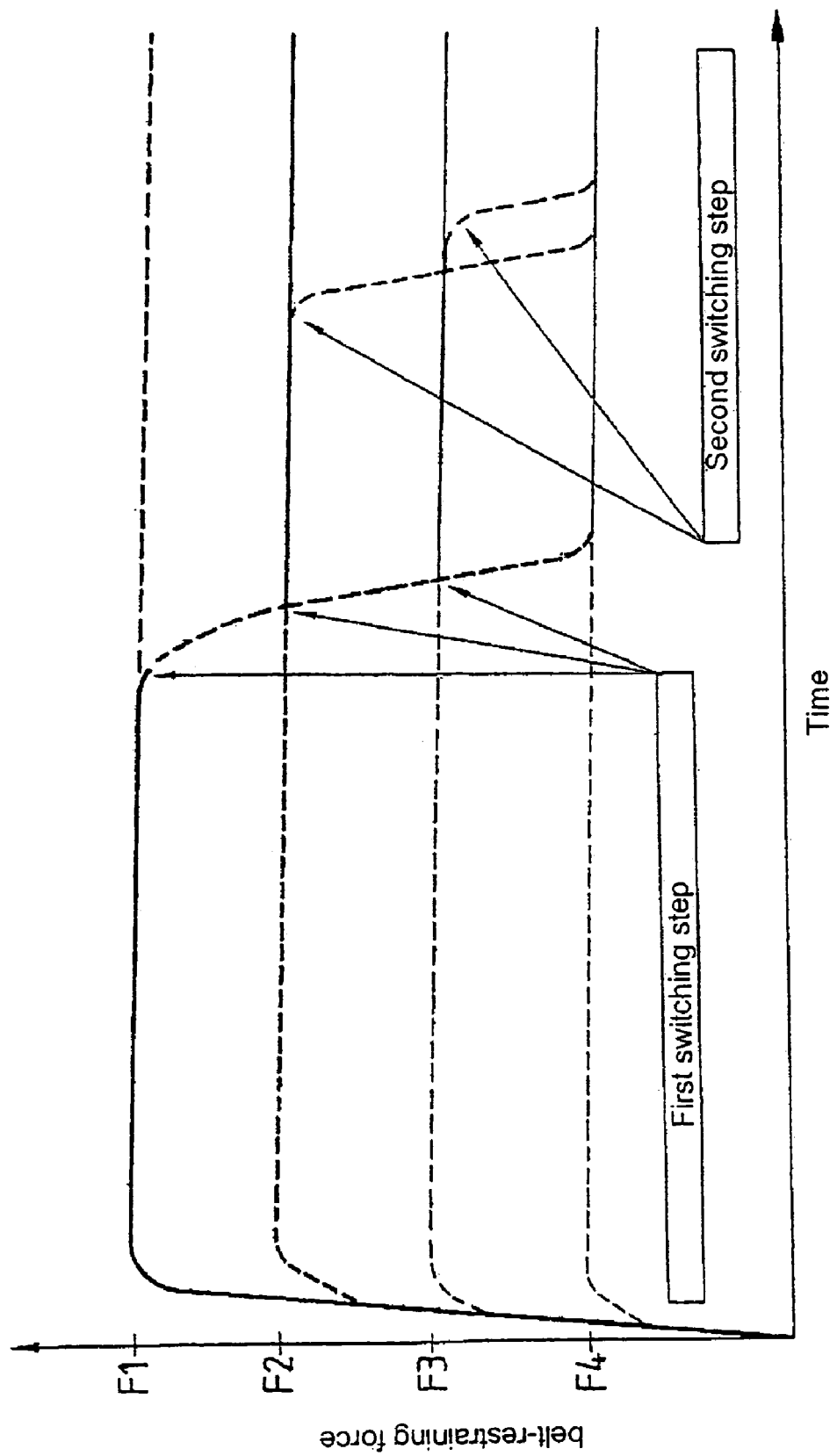
FIG. 2 is a diagram showing the time history of the retaining force of the seat belt, the diagram illustrating a switching-over of the retaining force.
Figure 3:
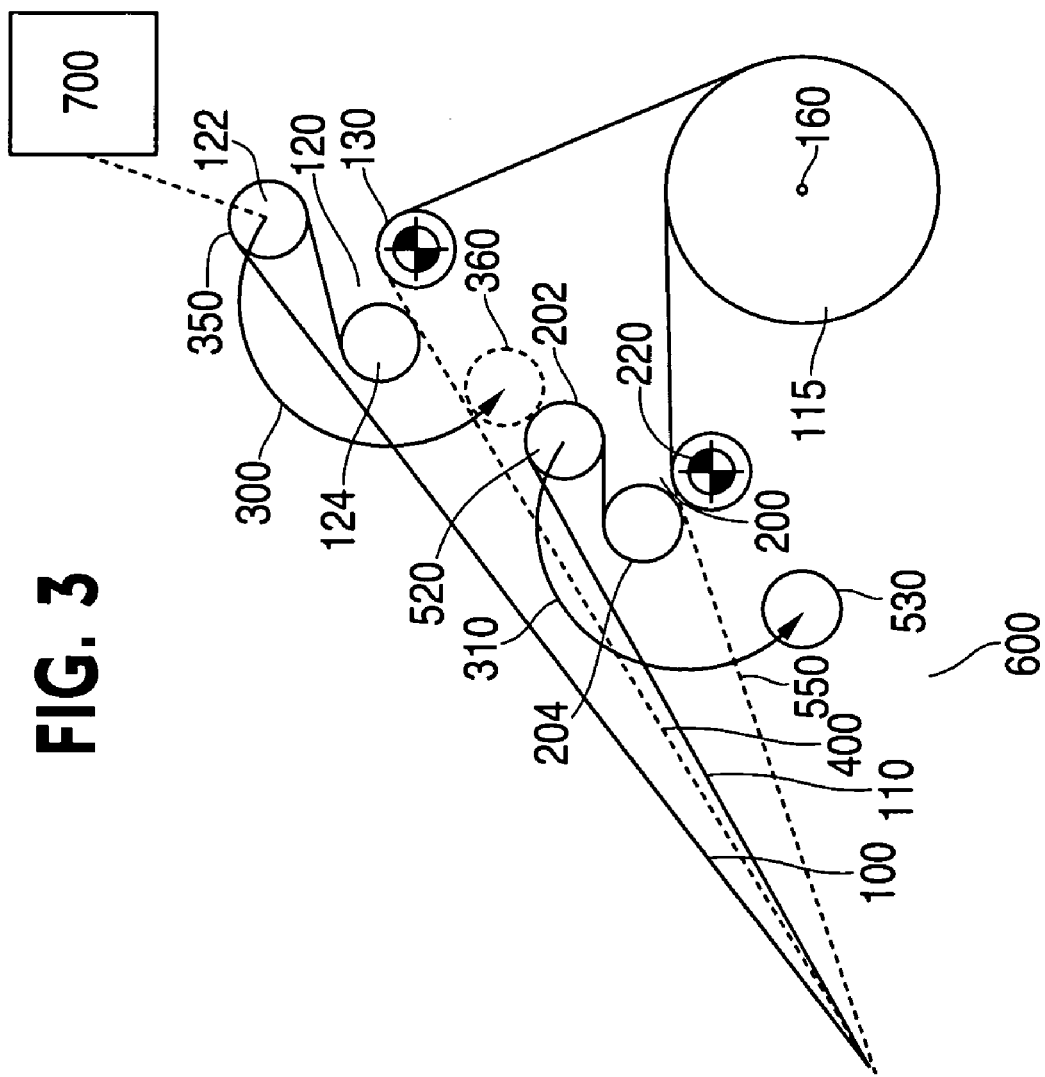
FIG. 3 is a view of an embodiment of a fastening device for a seat belt in which a switching rocker is switched over from a first position into a second position using a pyrotechnic device.
Figure 4:
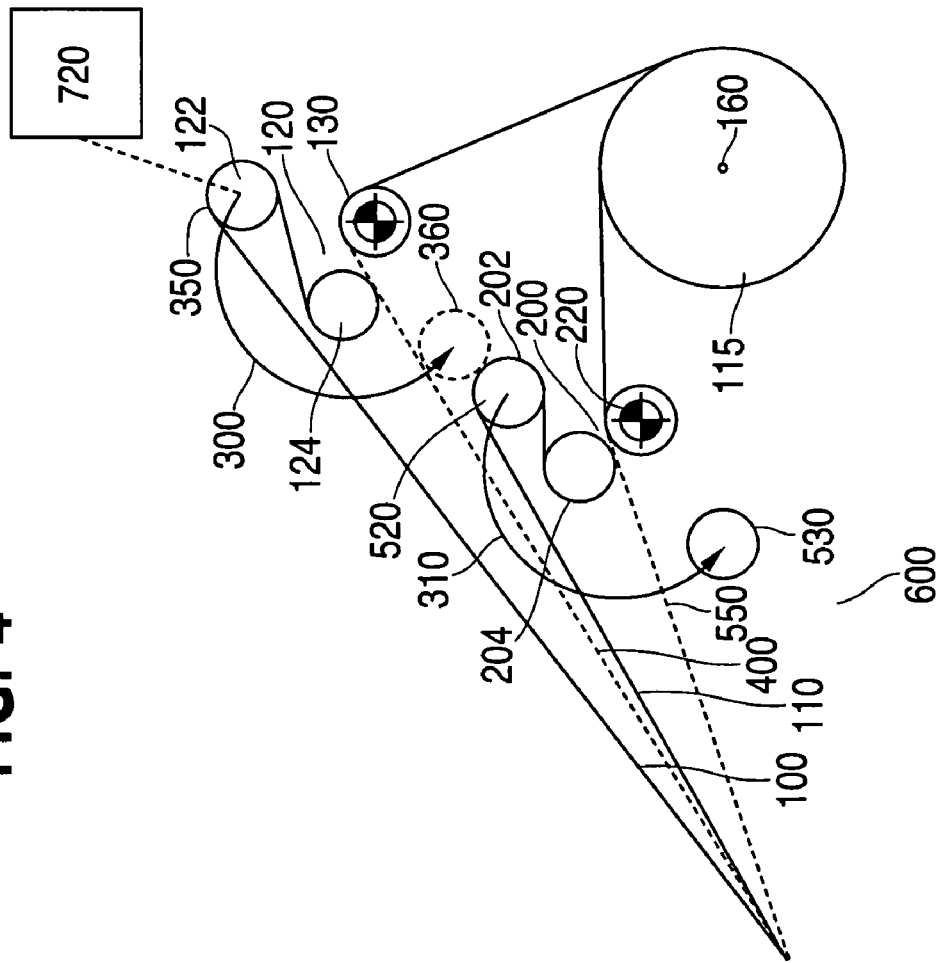
FIG. 4 is a view of an embodiment of a fastening device for a seat belt in which a switching rocker is switched over from a first position into a second position with an electromagnet.

If, for example, the first switching rocker 120 is brought from its first position into its second position, the resulting belt-restraining force is reduced to a value F2, as can be seen in FIG. 2.

If, instead of the first switching rocker 120, the second switching rocker 200 is switched over, then the resulting belt-restraining force is reduced to a value F3, as can be seen in FIG. 2. If the two switching rockers 120 and 200 are switched over, then the resulting belt-restraining force is reduced to a value F4.

In a first switching step, the belt-restraining force can therefore be switched over from the value F1 to one of the values F2, F3 or F4. If a switch is made to the belt-restraining force F2 or F3, then, in a second switching step, the belt-restraining force can be further reduced to the value F4.

As a result, it is therefore possible, in the case of the fastening device according to FIG. 1, to set the restraining force for the seat belt 5. Thus, by selection of the switching position of the two switching rockers 120 and 200, one of four different values for the belt-restraining force can optionally be preset, and the belt-restraining force can be reduced stepwise during a crash or accident.

In the case of the fastening device according to FIG. 1, the deflecting rollers 122, 124, 130, 202, 204 and 220 are provided for bending over the two wires 100 and 110; instead of deflecting rollers use may also be made of deflecting rods. In addition, deflecting rods and deflecting rollers may also be combined or used together.

In the case of the fastening device according to FIG. 1, instead of two switching rockers more switching rockers may also be used if the intention is to achieve a force limitation with even more stages. If, in contrast, just two different stages for the belt-restraining force are sufficient, then it suffices if the fastening device has just a single switching rocker and a single wire.

Moreover, in addition to the two wires according to FIG. 1, further wires may also be used.

If it is regarded as sufficient to provide just a single value for the belt-restraining force, a switching rocker may also be completely omitted. The belt-restraining force can then be set by one or more "bending elements" which bend over the wire or the wires and, by means of the bending-over, determine the belt-restraining force. The bending element or bending elements can be formed, for example, by means of rods and/or deflecting rollers.

An object of the invention is specifying a fastening device for a seat belt, in which the restraining force can be set or predetermined virtually as desired within a wide range. For example, the restraining force may be influenced by the occupant's weight and/or the severity of the accident.

The invention for the belt-force-limiting element may have at least one wire-unwinding device from which wire can be pulled on exertion of a predetermined tensile force. If at least one end of the seat belt is connected indirectly or directly to the wire, this results in the wire being pulled out of the wire-unwinding device as soon as a person protected by the seat belt—as a rule therefore a vehicle occupant—exerts a correspondingly large tensile force on the seat belt in the event of an accident.

An advantage of the fastening device according to the invention is the separation of the actual "belt system" on the one side and the "belt-force-limiting system" on the other side. Unlike, for example, in the case of the conventional belt retractor, in which the torsion bar is directly part of the belt-retracting mechanism—the wire-unwinding device as belt-force-limiting system is connected exclusively via one wire or via a number of wires to the belt system and can therefore be optimized in a very individual manner. Thus, the belt can readily be braked or else released as a function of force and deflection by means of corresponding devices within the wire-unwinding device, thus enabling virtually any desired force-limiting characteristic to be achieved. For example, a two-stage or multi-stage, degressive force limitation can be achieved without greater outlay by the wire deflection or the pulling of the wire out of the wire-unwinding device being increasingly facilitated by the "isolation" of frictional and/or deformation forces ("bending forces")—i.e. "braking" forces.

In order to ensure that the belt-force limitation still reliably functions even after many years of operation, it is regarded as advantageous if the "braking" forces used are exclusively deformation forces or bending forces; frictional forces are very heavily dependent on the surface composition of the objects rubbing against each other and can change, for example, owing to corrosion or the like. It is therefore regarded as advantageous if the at least one wire is bent over at least once as it is being pulled out.

The bending-over of the at least one wire as it is being pulled out can be achieved in a particularly simple and therefore advantageous manner by means of at least one deflecting roller and/or deflecting rod.

It is regarded as advantageous if the fastening device according to the invention for a seat belt is integrated in a belt-retracting device. This can be carried out advantageously and in a simple manner by a spindle of the belt-retracting device, which spindle retracts and/or unrolls the belt, interacting indirectly or directly with the at least one wire of the wire-unwinding device.

The spindle can be connected to the at least one wire of the wire-unwinding device in a particularly simple and therefore advantageous manner if a ratchet ring is arranged in the fastening device in such a manner that it can be connected in a rotationally fixed manner via a pawl to the spindle. As soon as a connection between the spindle and the ratchet ring is achieved by the pawl, the wire which is pulled out of the wire-unwinding device is coiled round a wire magazine of the ratchet ring.

Moreover, it is regarded as advantageous if the wire-unwinding device provides at least two different "tensile forces" or belt-retaining forces. This can be achieved in a particularly simple manner and therefore advantageously with a switching rocker which readjusts or changes the tensile force required to pull out the wire from the wire-unwinding device. With regard to a switching rocker of this type, it is regarded as advantageous if the latter has two positions, of which one position of the switching rocker results in a higher tensile force for pulling out the wire than the other position. Using a switching rocker of this type, two different retaining forces of the seat belt can therefore be set in a relatively simple manner.

The one position of the switching rocker, in which a higher tensile force is therefore required for pulling out the wire than in the other position, can be achieved in a particularly simple manner by the wire, in this position of the switching rocker, being deflected at least once as it is being pulled out.

In a particularly simple and therefore advantageous manner, the switching rocker can be switched over from the one position into the other position using a pyrotechnic device 700. A substantial advantage of the pyrotechnic readjustment can be found in the fact that this takes place very rapidly.

However, the disadvantage of the pyrotechnic switching over is that pyrotechnic material is a "hazardous product". If the use of such a hazardous product is to be avoided, then the switching rocker may also be switched over from the one position into the other position in a very simple manner by means of an electromagnet 720. This is because switching rockers, owing to their arrangement, endeavor automatically to switch themselves over, which means that a blocking lock by an electromagnet 720 can easily be removed. The switching rocker can therefore be switched over from the one position into the other position solely by removal of the blocking lock.

In order to ensure that the position of the switching rocker is not switched over abruptly, but rather continuously or largely continuously, it is regarded as advantageous if the switching rocker is arranged in such a manner that it has to carry out work of deformation during the transfer from the one position into the other position.

The priority application, DE 103 08 167.4, filed Feb. 20, 2003, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:
1. A fastening device for a seat belt comprising:
   a belt-force-limiting element which limits a retaining force acting on a person protected by the seat belt by enabling the seat belt to yield to a predetermined extent;
   wherein the belt-force-limiting element comprises a wire-unwinding device from which a wire can be pulled by an exertion of a predetermined tensile force, and wherein one end of the seat belt is connected indirectly or directly to the wire so that the wire is pulled out of the wire-unwinding device when the retaining force exerted by the seat belt on the occupant reaches the predetermined tensile force,
   wherein the wire-unwinding device comprises a switching rocker for guiding the wire; and wherein the switching rocker includes first and second positions, wherein the first position of the switching rocker results in a different tensile force for pulling out the wire than the second position.

2. The device of claim 1, wherein the fastening device is configured so that the wire bends during withdrawal from the unwinding device.

3. The device of claim 2, wherein the wire is bent by a deflecting roller.

4. The device of claim 2, wherein the wire is bent by a deflecting rod.

5. The device of claim 1, further comprising: a belt-retracting device with a spindle which retracts and unrolls the belt and interacts indirectly or directly with the wire of the wire-unwinding device.

6. The device of claim 5, further comprising a ratchet ring which can be connected in a rotationally fixed manner via a pawl to the spindle; wherein the ratchet ring includes a wire magazine on which the wire pulled out of the wire-unwinding device is coiled round.

7. The device of claim 1, wherein the fastening device is configured so that the wire is deflected during withdrawal from the unwinding device when the switching rocker is in the first position.

8. The device of claim 1, wherein the switching rocker is switched over from the first position into the second position pyrotechnically.

9. The device of claim 1, wherein the switching rocker is switched from the first position into the second position with an electromagnet.

10. The device of claim 1, wherein the switching rocker is configured to deform during the transfer from the first position into the second position.

11. A seat belt system comprising:

a seat belt retractor; and a wire-unwinding device including a deflecting roller, a wire reel, a wire magazine, and a switching rocker for guiding a wire;

wherein the wire-unwinding device is configured to act on the belt retractor to limit a retaining force acting on an occupant protected by the seat belt system, wherein the switching rocker includes first and second positions, wherein the first position of the switching rocker results in a different tensile force for pulling out the wire than the second position.

12. The device of claim 11, wherein the wire is configured to be dispensed from the reel when a predetermined tensile force is applied to the wire.

* * * * *